United States Patent [19]

Dyck

[11] 4,429,822
[45] Feb. 7, 1984

[54] CLUTCH AND MULTIPLE SPEED CAPSTAN TAPE DRIVE MECHANISM AND TAPE POSITION INDICATOR FOR TAPE TRANSPORT

[75] Inventor: Arthur Dyck, Abbotsford, Canada

[73] Assignee: Gunstream Industries, Inc., Denver, Colo.

[21] Appl. No.: 282,811

[22] Filed: Jul. 13, 1981

[51] Int. Cl.³ .................... B65H 17/22; B65H 17/00
[52] U.S. Cl. ........................................ 226/188; 226/61
[58] Field of Search ............... 360/73; 242/55.19 A; 226/181, 188, 61, 187

[56] References Cited

U.S. PATENT DOCUMENTS

| | | | |
|---|---|---|---|
| 3,275,208 | 9/1966 | Poumakis | 226/188 X |
| 3,385,497 | 5/1968 | Taraborrelli | 226/188 X |
| 3,420,471 | 1/1969 | Cousino | 242/55.19 |
| 3,486,675 | 12/1969 | Kreckman | 226/181 X |
| 3,595,499 | 11/1969 | Crafts | 226/188 X |
| 3,666,153 | 5/1972 | Stahl | 226/178 X |
| 3,726,457 | 4/1973 | Staar | 226/90 |
| 3,834,648 | 9/1974 | Rose, Jr. et al. | 242/57 X |
| 4,006,853 | 2/1977 | Bara | 226/188 X |
| 4,127,239 | 11/1978 | Dyck | 242/55.19 |

FOREIGN PATENT DOCUMENTS

| | | | |
|---|---|---|---|
| 2615109 | 10/1977 | Fed. Rep. of Germany | 226/188 |
| 892871 | 8/1960 | United Kingdom | 360/73 |

Primary Examiner—Stuart S. Levy
Assistant Examiner—Dao van Huynh
Attorney, Agent, or Firm—John R. Ley

[57] ABSTRACT

A tape transport apparatus for recording tape having a rotationally driven tape drive capstan for advancing the tape and a pinch roller for firmly engaging the tape with the tape drive capstan includes a rapid tape advancement feature. Clutch devices selectively couple rotational driving force to the tape drive capstan from a first normal playing rate motor devices or a second high speed advancement motor devices. The clutch devices are centrifugal force-actuated and of a ratchet-like nature. A rotating element connected to the tape drive capstan includes a code, and a sensor which senses the code and derives signals indicative of each revolution of the tape drive capstan. The signals are electrically processed and an accurate measurement of the extent of tape advancement is obtained and displayed.

14 Claims, 11 Drawing Figures

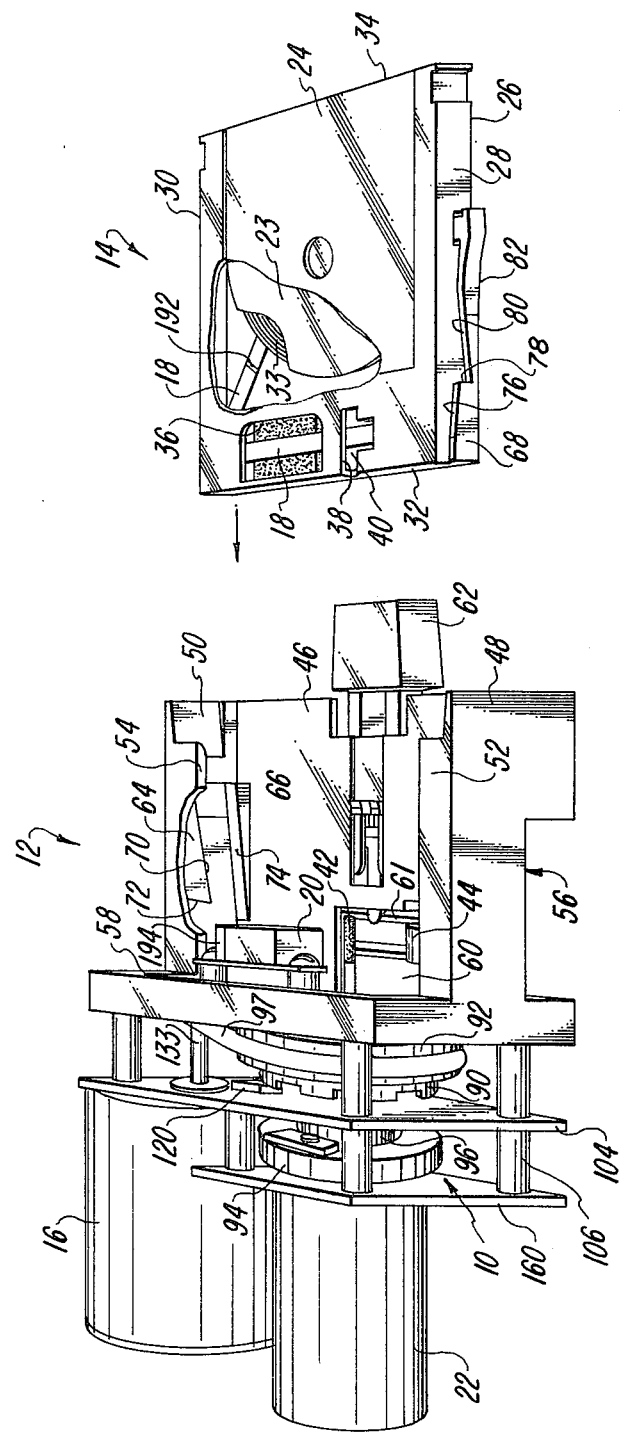
Fig_1

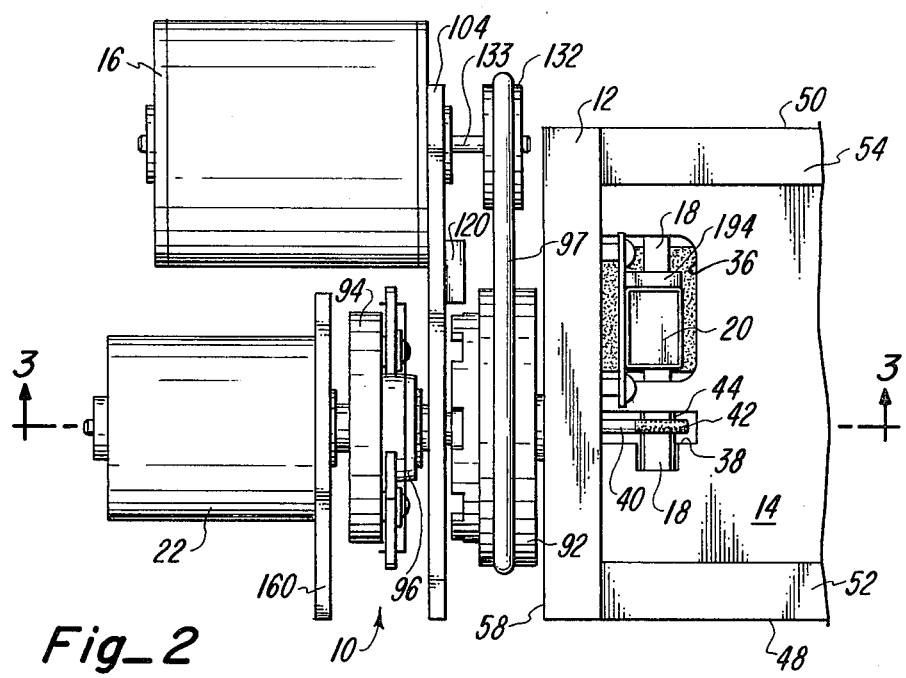
Fig_2
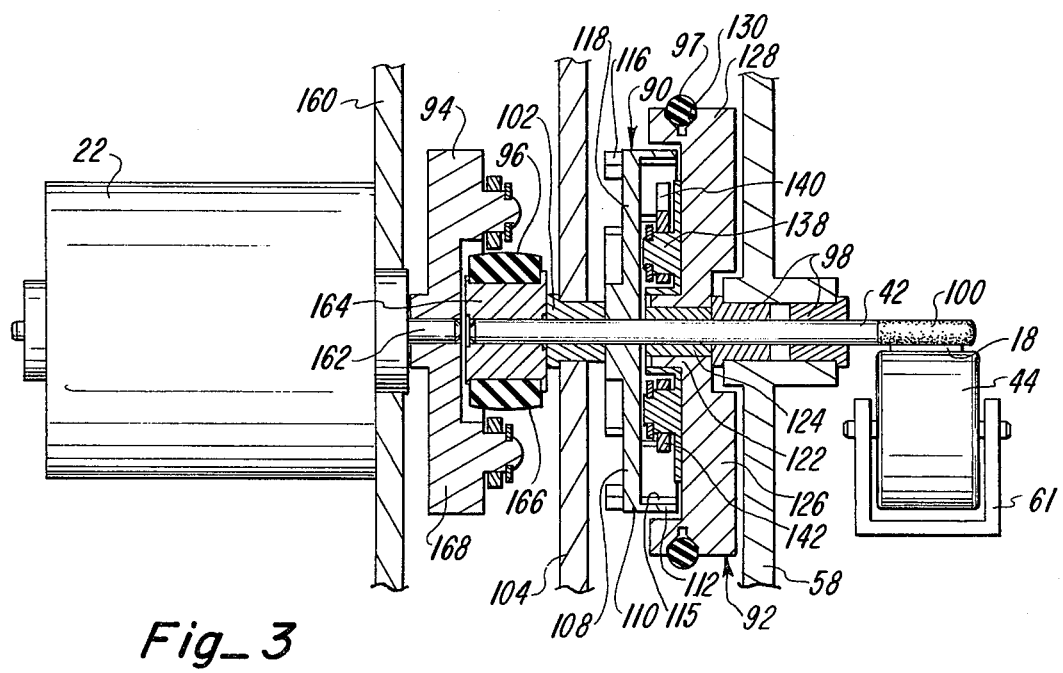
Fig_3

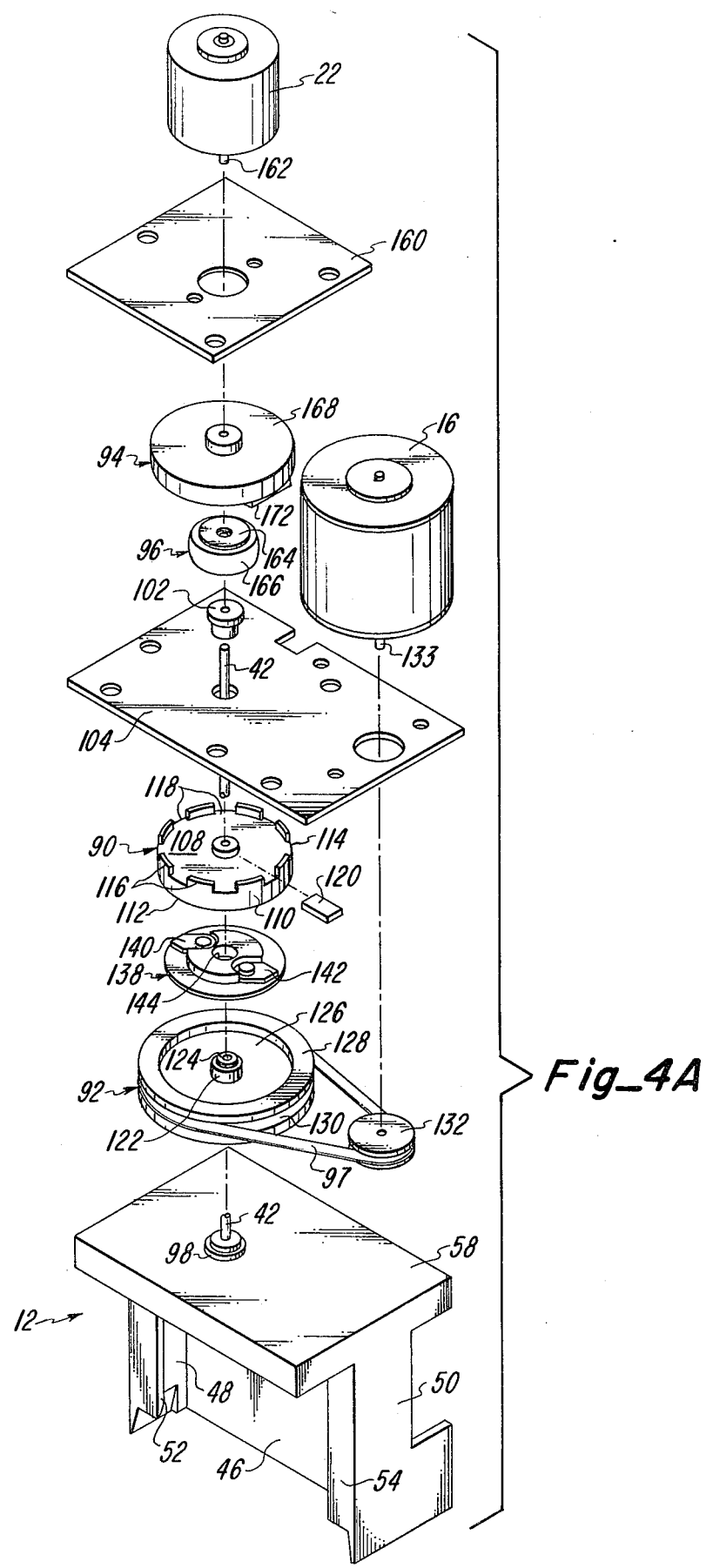
Fig_4A

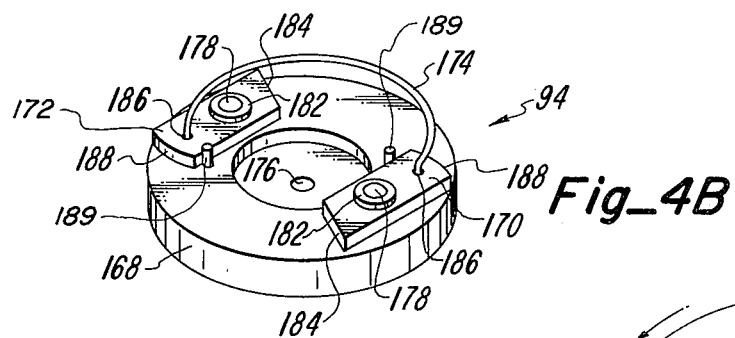
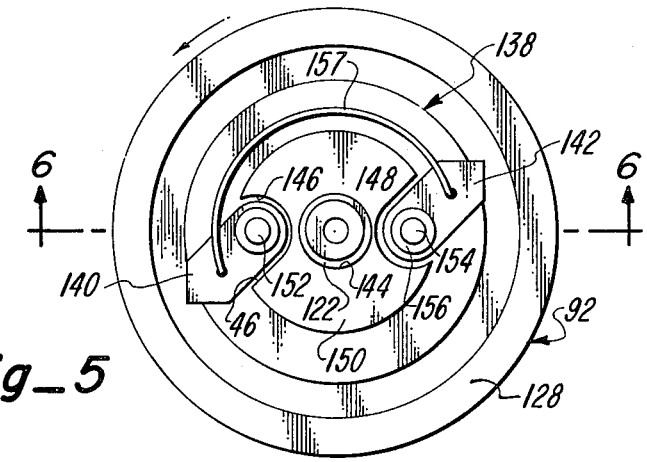
Fig_5
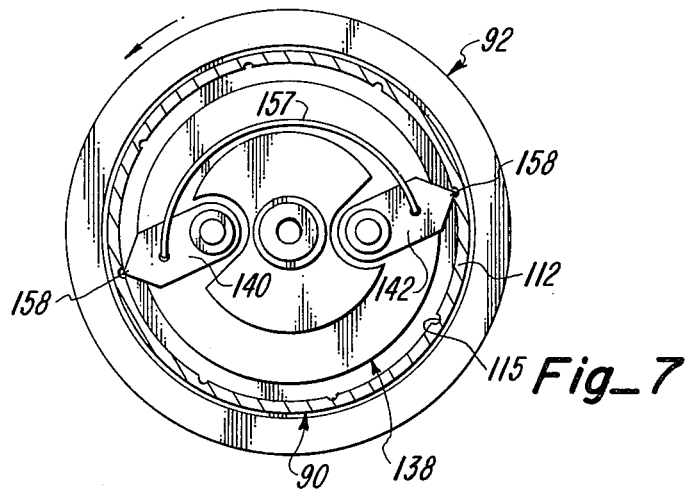
Fig_7
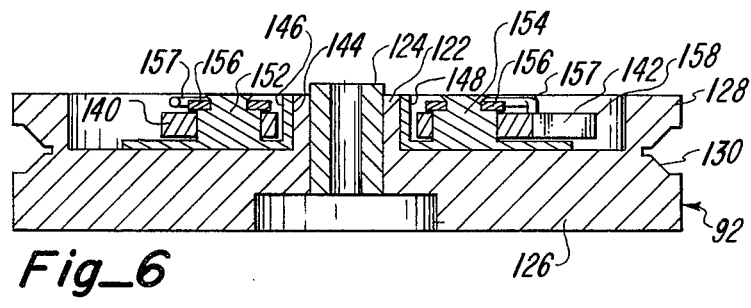
Fig_6

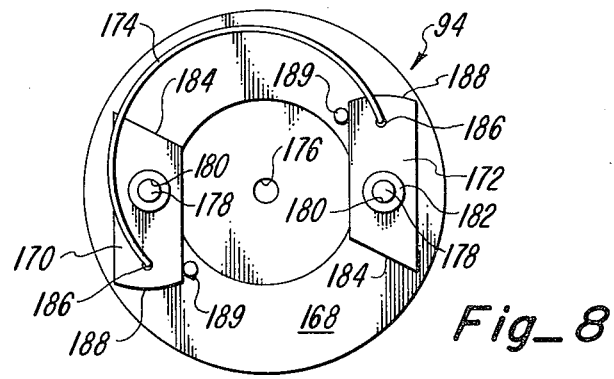
Fig_8
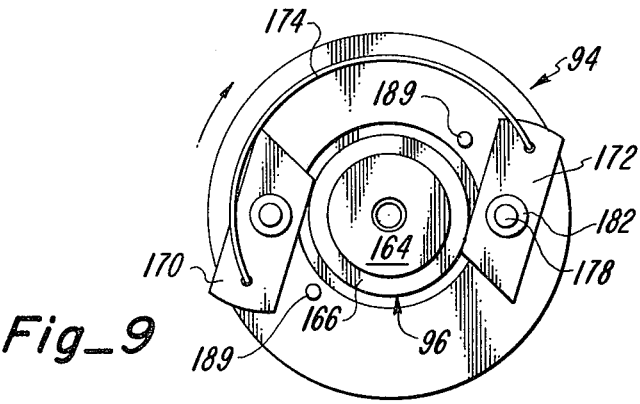
Fig_9
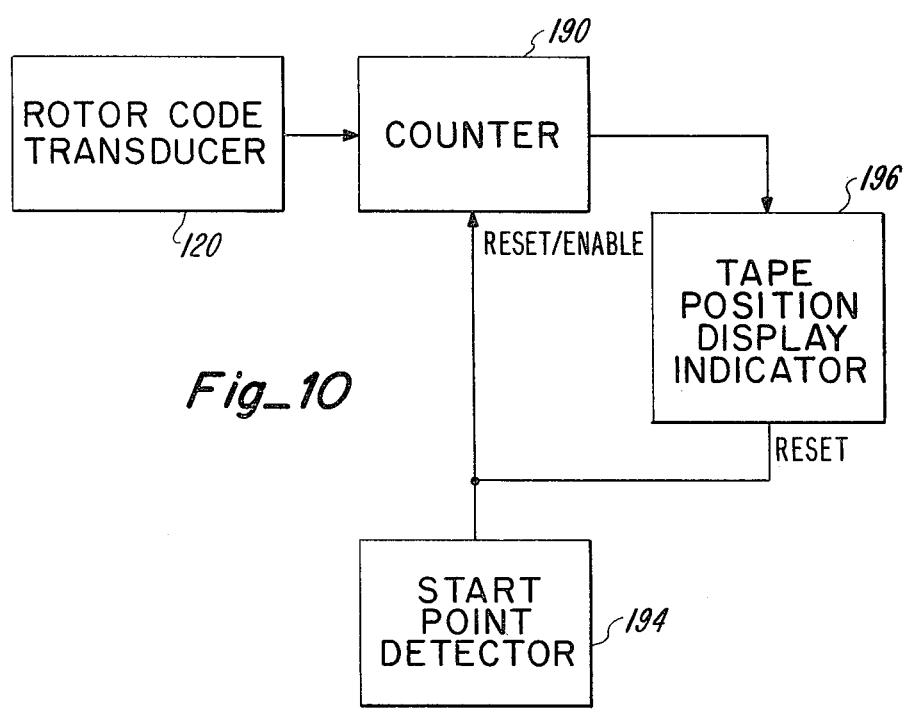
Fig_10

CLUTCH AND MULTIPLE SPEED CAPSTAN TAPE DRIVE MECHANISM AND TAPE POSITION INDICATOR FOR TAPE TRANSPORT

This invention pertains to a new and improved tape transport apparatus for magnetic tapes, including tapes contained in cartridges. More particularly, the present invention pertains to a new and improved clutch and multiple speed tape drive mechanism for selectively rotating or driving a tape drive capstan from one of a plurality of different-speed motor sources in a tape transport. The present invention is particularly adapted for use with tape transports of the type disclosed in U.S. Pat. No. 3,726,457. Such tape transports are used with continuous endless-loop tape cartridges such as those disclosed in U.S. Pat. Nos. 3,420,461 and 4,127,239. The broad aspects of the present invention are, however, applicable to a wide variety of tape transports.

Two desirable features of a tape transport are a fast forward or high-speed advance function and an accurate tape position indication function. The rapid advance feature allows the tape to be rapidly moved at high speed to a predetermined location for playing back or recording information. The tape position indication feature provides the ability to accurately identify particular locations on a lengthy expanse of tape where information is to be recorded or has previously been recorded, both at normal playing speed and at high speed. Only reel-to-reel transports and cassette player transports offer these desirable features. To the extent presently known, the high speed advance and tape position indication functions have not previously been incorporated in transports operative with continuous endless-loop tape cartridges such as the type disclosed in the aforementioned U.S. Pat. Nos. 3,420,461 and 3,726,457.

It is typical in transport apparatus for continuous endless-loop tape cartridges to shift the signal reception capability of the transducer head between the different ones of multiple parallel recorded sound or information tracks on the tape. Although shifting the reception capability of the transducer head can index different sound tracks and gain access to different fractional intervals of the total recording space available, substantially the whole length of the tape must still be transported or played through at the normal playing speed before any particular location on any one of the multiple information tracks can be achieved. Quickly gaining access to any selected location on a continuous endless loop of tape has previously been impossible.

Cassette and reel-to-reel tape transports typically include means for rapidly advancing the tape at high speed and means for measuring and indicating positions along the length of the tape. Inclusion of rapid advance and position indicating functions in cassette and reel-to-reel tape transports is primarily a result of the differing nature and operation of such transports as compared to the transports for continuous endless-loop tape cartridges. For cassette and reel-to-reel transports, the tape is wound on a pair of spools. Spindles extend into the spools and the spindles rotate the spools to wind tape around one of the spools while unwinding it from the other spool. Motors and flywheels usually rotate one or more of the spindles to move or transport the tape with respect to a transducer. A pinch roller frictionally engages the tape against a rotationally mounted tape capstan, and the rotational rate of the tape capstan is used in controlling the speed of the tape during normal playing. When the tape is rapidly advanced, the flywheel is disconnected from the driving spindle and a high speed motor is connected to the driving spindle. The pinch roller is withdrawn to avoid holding the tape against the tape capstan during high speed movement. A revolution counter is connected to the driving spindle and indexes with each revolution of the driving spindle and tape spool. Of course, as more tape is wound onto the spool, each revolution results in a slightly increased circumference of the tape coil on the spool and hence the linear rate of tape movement increases with the increasing circumference. The inherent nonlinearity created by the constantly changing circumference of tape roll coiled on the spool introduces inaccuracies in indications of the tape position measured during advancement. To the extent now known, tape position measurement and indication features have never been incorporated in continuous endless-loop tape transports.

The tape drive mechanism in a tape transport for continuous endless-loop tape cartridges basically comprises a rotationally driven capstan. The continuous tape of the endless loop is frictionally held firmly against the tape driven capstan by the pinch roller. The motion imparted by the tape drive capstan moves the tape past the transducer. The moving tape unrolls tape from the innermost coil of the single roll of tape carried on a single spool in the endless-loop tape cartridge and is returned to the outermost coil of the tape roll on the same spool. The spool rotates as a result of unwinding the tape from the innermost coil and returning it to the outermost coil. The difference in linear uncoiling and coiling rates at the inner and outer coils of the roll of tape on the single spool is compensated for by slight sliding of each of the interior coils of tape relative to its neighbor. It is apparent, therefore, that the tape of an endless-tape cartridge can only be advanced by the tape drive capstan with the pinch roller firmly engaging the tape against the capstan. A single flywheel driven by a play motor has been permanently directly connected to the tape drive capstan in such endless-tape transports for the purpose of smoothly rotating the tape driven capstan at an even rate.

In cassette and reel-to-reel transports, clutching arrangements have been utilized to connect one or both of the spindles either to the play motor and flywheel or to a fast forward motor. These clutching arrangements are typically relatively complex and intended to function in conjunction with sizable tape spools, drive spindles and the like. The clutching arrangements in these types of tape transports also typically include elements for withdrawing the pinch roller away from the tape capstan. The physical dimensions of cassette and reel-to-reel transports are usually considerably larger than those of a conventional endless tape transport, thereby allowing room for the relatively more sizeable, complex and expensive clutching arrangements. The significance of certain improvements available from the present invention are better understood against this generally summarized background information.

SUMMARY

One primary objective of the present invention is to provide means for selectively rapidly advancing the tape in tape transports used with continuous endless-loop tapes. In accordance with this aspect of the present invention, there is provided a clutch and multiple speed drive mechanism for operatively driving the tape drive capstan. A play motor and a high speed motor supply rotational force for driving the tape drive capstan at the normal playing speed and at a rapid advancement speed, respectively. A clutch arrangement couples rotational movement at the playing speed from a flywheel to a rotor directly connected to the tape drive capstan. To rapidly advance the tape, the high speed motor is energized and a clutching arrangement of a high speed driver couples the high rotational movement to the rotor. Once the rotor and tape drive capstan are driven at a rate greater than the normal playing speed, the clutching arrangement between the rotor and the flywheel is released to allow the rotor and tape drive capstan to rotate at the higher rate. After sufficient high speed advancement, the high speed motor is de-energized and the clutching arrangement disconnects the high speed motor from the rotor and tape drive capstan. The clutching arrangement is preferably both centrifugal force-actuated and has ratchet-like characteristics. Being operated from centrifugal force, the clutching arrangement is positive in engagement and release and does not require additional coupling and disconnect devices for disconnecting one and connecting the other motor drive source from the tape drive capstan and rotor. The ratchet-like feature avoids complexity in construction and allows the present invention to be readily incorporated on tape transports of a compact size.

Another principal objective of the present invention is to provide a new and improved means for precisely and accurately measuring the linear advancement and position of the recording tape in a tape transport apparatus. In accordance with this objective, the pinch roller of the tape transport maintains a firm engagement of the tape against the capstan even during high speed advancement. The rotor includes a code, preferably optical, and electrical signals are derived by the movement of the code relative to an transducer. Signals from the transducer are supplied to a counter which accurately counts each rotation as well as fractional parts of each rotation of the capstan to accurately provide signals indicative of points on the linear length of the sound recording tape. When employed with continuous endless-loop tapes, a signal inducing medium is present on the tape and is sensed by the recording track information transducer or a tape position sensor to signal the beginning and ending point for measurement. The beginning and ending point signals also control the counter to begin counting at the beginning point and end counting or reset at the ending point.

Another objective of the present invention is to provide a clutching arrangement for selectively engaging and disengaging one of a multiple number of rotational drive sources with a tape advancement element of the tape transport apparatus. In accordance with this objective, a centrifugal force-operated, ratchet-like clutching arrangement is provided. Preferably, a pair of centrifugal force-operated engagement elements are pivotably mounted on a rotational element to radially engage and thus impart rotary motion to a tape advancement element of the tape transport. A plurality of such ratchet-like clutching arrangements are used in association with a single tape advancement element. When the rotational element carrying the engagement elements is rotated at a greater rotational rate than the previous rate of the tape advancement element, the engagement elements will operate to impart the greater rotational rate to the tape advancement element. The ratchet-like connection of the engagement elements on the more slowly rotating rotational element is released to disconnect the slower rotational source of the tape advancement element. The ratchet-like operation of the engagement elements fully transfers power to the tape advancement element without power loss, thereby achieving more efficient operation. The relative simplicity in nature and operation of the centrifugal force-operated engagement elements, coupled with their relatively high effectiveness for the purposes employed, provides a clutching arrangement which is reliable, does not consume excessive space, and which substantially isolates the selected motor source from the other motor sources in driving the tape advancement element.

The present invention is defined by the scope of the appended claims. Other objectives and advantages of the present invention and a more complete description of the nature of the invention are presented in the following drawings and description of the preferred embodiment.

DRAWING DESCRIPTIONS

FIG. 1 is a perspective view from the top and side of a tape transport apparatus and a tape cartridge for use with the tape transport. The tape cartridge is shown in spaced relation from the tape transport in the movement path leading to operative insertion in the tape transport. The major elements of the tape transport and the tape cartridge are illustrated.

FIG. 2 is a partial top view of the tape transport with the tape cartridge inserted in the tape transport, with portions of the transport removed for clarity.

FIG. 3 is a vertical section view taken in the plane of line 3—3 in FIG. 2, with certain portions of the cartridge removed for clarity.

FIG. 4A is an exploded perspective view of the elements of the clutch and multiple speed capstan tape drive mechanism and tape position inidicator of the present invention, which are shown in assembled relationship in FIGS. 1 to 3. FIG. 4B is a perspective view of a high speed driver element shown in FIG. 4A in inverted relationship.

FIG. 5 is a plan view of a flywheel means of the clutch and multiple speed capstan tape drive mechanism shown in FIG. 4A.

FIG. 6 is a section view taken in the plane of line 6—6 of FIG. 5.

FIG. 7 is a view similar to FIG. 5, additionally illustrating a portion of rotor means of the clutch and multiple speed capstan tape drive mechanism wherein engagement elements of the flywheel means are shown in operative engagement with the rotor means.

FIG. 8 is a top plan view of the high speed driver of the clutch and multiple speed capstan tape drive mechanism shown in FIGS. 4A and 4B.

FIG. 9 is a view similar to FIG. 8 additionally illustrating a portion of a drive wheel wherein elements of the high speed driver are shown in operative engagement with the drive wheel.

FIG. 10 is an electrical block diagram of certain elements of the clutch and multiple speed capstan tape drive mechanism.

PREFERRED EMBODIMENT

The new and improved clutch and multiple speed capstan tape drive mechanism 10 of the present invention is generally described in relationship to a tape transport apparatus 12 and a tape cartridge 14 shown in FIGS. 1 and 2. The clutch and multiple speed capstan tape drive mechanism 10 is operatively a part of the tape transport 12. When the tape cartridge 14 is operatively positioned in the tape transport 12, as shown in FIG. 2, a play motor 16 of the clutch and multiple speed capstan tape drive mechanism 10 operatively moves a magnetic tape 18 of the cartridge 14 at normal playing speed past a transducer head 20 of the transport 12. Electrical signals are derived by the transducer head 20 as a result of the magnetically oriented oxide coating on the magnetic tape 18 moving past magnetic sensing elements (not shown) of the head 20. The electrical signals are amplified and otherwise utilized in a conventional manner. In order to rapidly advance the tape 18 and place another remotely located segment of the tape 18 beneath the transducer head 20, driving force from a rapid advance or high speed motor 22 of the mechanism 10 is applied for rapidly advancing the tape. After the tape 18 has been advanced to a desired position, the rapid advance motor 22 is de-energized and the play motor 16 again drives the tape 18 at the normal playing speed past the transducer head 20.

TRANSPORT AND CARTRIDGE

The tape cartridge 14 is known and appreciated in the art. The basic nature of the cartridge 14 is disclosed in U.S. Pat. No. 3,420,461, and certain advantageous improvements are disclosed in U.S. Pat. No. 4,127,239. In general, however, the cartridge 14 includes a single continuous endless loop of magnetic recording tape 18. The majority of the endless loop of tape is coiled in a plurality of convolutions or coils around a spool 23. The spool 23 is rotationally positioned between a top cover 24, a bottom cover 26, side walls 28 and 30, a front wall 32 and a rear wall 34, all of which define a housing for the tape cartridge 14.

The theory of operation of endless-loop tapes and the tape cartridge 14 is well known. Suffice it to say that the tape is withdrawn from a radial innermost convolution of a tape roll 33 on the spool, twisted over angularly oriented tape guides (not shown) within the tape cartridge housing near the corners at the front end wall 32 and side walls 28 and 30, presented in an aperture 36 in a plane parallel to the top and bottom covers 24 and 26, and is returned to the outermost convolution of the tape 33 roll on the single spool 23. To compensate for the difference in the unwinding and winding rates occasioned by the fact that the circumference of the tape roll 33 at the innermost convolution is less than the circumference of the tape roll at the outermost convolution, each of the convolutions of the roll 33 slide slightly with respect to one another as the spool rotates. The aperture 36 is formed in the top cover 24, and the tape 18 passing through the aperture is located directly beneath the transducer head 20 when the cartridge is positioned in operative relationship in the transport, as shown in FIG. 2. A small aperture 38 is formed in the top cover 24, and a relatively large aperture 40 is formed in the bottom cover 26 vertically below the small aperture 38.

When the cartridge is retained in an operative position in the transport 12, a tape drive capstan 42 of the transport 12 fits within the aperture 38 and contacts the upper flat surface of the tape 18. A pinch roller 44 is biased upwardly into the bottom cover aperture 40 and contacts the bottom planar surface of the tape 18. Bias force from the pinch roller forces the tape into firm frictional engagement with the tape drive capstan 42. Rotation of the tape drive capstan causes the tape to advance past the transducer head 20 and to wind and unwind from the roll 33 on the single spool 23 in the tape cartridge housing.

Certain features of the tape transport 12 are more fully described in the aforementioned U.S. Pat. No. 3,726,457. The cartridge 14 is inserted into and removed from an opening defined by the space between a bottom wall 46, opposite side walls 48 and 50, and top edges 52 and 54, of a transport frame 56. A rear wall 58 of the transport frame 56 operatively positions and locates the tape drive capstan 42 and the transducer head 20 at stationary locations. An aperture 60 is formed in the bottom wall 46 below the tape drive capstan 42. The pinch roller 44 is rotationally attached to the end of an arm 61 pivotably connected beneath the bottom wall 46. Means (not shown) biases the arm 61 and the attached pinch roller 44 toward an upper pivoted position in which the pinch roller 44 extends through the aperture 60 and above the upper surface of the bottom wall 46 and into contact with the capstan 42 (unless the tape 18 is therebetween). A latch mechanism (not specifically shown) holds the arm 61 and its attached pinch roller in a downward biased position during times when the cartridge 14 is not retained in the transport. A trigger mechanism (also not specifically shown) releases the latch mechanism when the cartridge is fully inserted, thereby releasing the arm 61 to pivot to its upper position. A cartridge release mechanism operated by a finger button 62 is provided to release the cartridge 14 from operative retention in the transport 12 in order to remove the cartridge. The latch mechanism, the trigger mechanism and the release mechanism are described in greater detail in U.S. Pat. No. 3,726,457.

The tape transport 12 automatically positions the tape 18 between the tape drive capstan 42 and the pinch roller 44 and adjoining the transducer head 20 when the cartridge 14 is inserted into and operatively retained by the transport. Automatic positioning of the tape in this manner is achieved by causing the front end of the cartridge housing to pivot or move transversely upward as the cartridge reaches its fully inserted position within the transport. Just before the front end of the cartridge housing pivots upward to the position shown in FIG. 2, the transducer head 20 and tape drive capstan 42 are positioned above the apertures 36 and 38, respectively, and above the tape 18 in those apertures. Similarly, the pinch roller 44 is positioned below the bottom cover aperture 40. When maximumly inserted, the front end wall 32 of the cartridge 14 contacts elements (not shown) of the trigger mechanism located on the transport rear wall 58, and the biased arm 61 carrying the pinch roller 44 is released to pivot upward. The upward moving arm 61 contacts the bottom cover 26 of the cartridge 14 and lifts the cartridge upward to its operative retained position, shown in FIG. 2. The pinch roller 44 contacts the underside of the tape 18 and forces the tape 18 firmly against the tape drive capstan 42. To release the cartridge from its operative engagement with the transport, the release mechanism is operated by manipulating the button 62. The upwardly biased arm connected to the pinch roller is pivoted to its downward position, and the cartridge moves downward away from the tape drive capstan and the transducer head. The cartridge can thereafter be freely removed from the transport.

In order to confine the tape cartridge 14 to a predetermined movement path during insertion and removal of the cartridge from the transport 12, and to hold the cartridge 14 in a relatively fixed operative position during use, cartridge guides 64 and 66 are provided on the transport frame 56 and lateral projections 68 are provided on each side wall 28 and 30 of the tape cartridge 14. Upper cartridge guides 64 extend downwardly from each top edge 52 and 54, and each guide 64 presents a downwardly and rearwardly inclined lower surface 70 which is rearwardly terminated by an approximately vertical shoulder surface 72. Lower cartridge guides 66 extend upward from the bottom wall 46 adjacent each side wall 48 and 50. Each lower tape cartridge guide 66 defines a downwardly and rearwardly inclined upper surface 74 which slopes into the upper surface of the bottom wall 46. One projection 68 extends laterally outward from each of the side walls 28 and 30 of the cartridge 14. Each projection 68 defines a leading surface 76 extending approximately parallel to the top and bottom covers 24 and 26. The leading surface 76 terminates at a stop shoulder surface 78 extending approximately vertically downward from the rear end of the surface 76. An inclined surface 80 extends from the lower end of the stop shoulder surface 78 upward and rearward toward the rear wall 34 of the cartridge 14. A flat lower edge 82 extends along the bottom of each projection 68 in the plane of the lower surface of the bottom cover 26.

During insertion and removal of the cartridge, the leading surface 76 and bottom surface 82 of the projection 68 on the cartridge 14 contact and slide along, respectively, the surface 70 of the upper cartridge guide 64 and the surface 74 of the lower cartridge guide 66, on each transverse side of the cartridge 14 and transport frame 56. When the cartridge 14 reaches the fully inserted position, its front end wall 32 contacts elements (not shown) of the trigger mechanism on the rear wall 58 of the transport frame 56, and the trigger mechanism releases the pivotably mounted arm 61 carrying the pinch roller 44. At this point, the shoulder surface 72 of each cartridge guide 64 is vertically aligned with the stop shoulder surface 78 of the cartridge projection 68. The upward movement of the arm 61 carrying the pinch roller 44 moves the forward end of the cartridge upward, and the cartridge stop shoulder surface 78 slides upward along the guide shoulder surface 72. In the operative retained position, the cartridge 14 is restrained against vertical movement by the top edges 52 and 54 contacting the top cover 24 and by the upward biased arm 61 carrying the pinch roller contacting the bottom cover 26. Movement parallel to the plane of the covers 24 and 26 is prevented by the contacting abutting surfaces 72 and 78 and by the abutting contact of the front end wall 32 with elements of the trigger mechanism on the rear wall 58 of the transport frame 56. To release the cartridge from its operative retained position, the button 62 is manipulated to operatively withdraw the arm 61 carrying the pinch roller 44 from its upward biased position and to simultaneously move an arm (not shown) downward on top of the top cover 24 and pivot the forward end of the cartridge downward. Once the vertical surfaces 72 and 78 no longer contact one another, the cartridge 14 can be manually withdrawn.

An electrical switch (not shown) operatively controls the motors 16 and 22, in accordance with the position of the arm 61 carrying the pinch roller 14 to prevent operation of the motors 16 and 22 at times other than when the cartridge is in its operative retained position. When the arm 61 is in its lowermost pivoted position, thereby allowing the cartridge to be freely inserted and removed, the electrical switch is opened. When the cartridge is in its operative retained position and the arm 61 carrying the pinch roller is biased upward, the electrical switch is closed to allow operation of the motors 16 and 22. The tape 18 can only be advanced when the cartridge 14 is in its operative position.

CLUTCH AND MULTIPLE SPEED CAPSTAN TAPE DRIVE MECHANISM

The clutch and multiple speed capstan tape drive mechanism 10 is described in relationship to the tape transport 12 and the tape cartridge 14 by reference primarily to FIGS. 2, 3 and 4A. The mechanism 10 includes a rotor 90 fixed to the shaft of the tape drive capstan 42, a flywheel 92 rotationally positioned on the shaft of the tape drive capstan 42 and operatively arranged to interact with the rotor 90, a high speed driver 94 operatively positioned to also interact with a drive wheel 96 attached to the other end of the shaft of the tape drive capstan, the rapid advance motor 22 operatively connected for rotating the high speed driver 94, and the play motor 16 operatively connected by a belt 97 to rotate the flywheel 92. The general function of the mechanism 10 is to automatically and selectively couple the rotational movement from the flywheel 92 to the tape drive capstan 42 or, alternatively, automatically couple the rotationally greater movement supplied by the high speed motor 22 to the tape drive capstan 42. The greater one of the rotational rates of either the flywheel 92 or the high speed driver 94 is automatically coupled by a ratchet-like and centrifugal force-operated clutch mechanism to the capstan shaft.

The component elements of the mechanism 10 are positioned on the opposite side of the rear wall 58 of the transport frame 56 from the cartridge. A pair of bushings 98 extend through the transport rear wall 58 and rotationally support the shaft of the capstan 42 at a position adjacent its knurled end 100 which contacts the tape 18. The shaft of the capstan 42 is also supported by an additional bushing 102 retained by an intermediate plate 104 adjacent the other end of the capstan shaft. The plate 104 is retained to the transport rear wall 58 by means 106 (FIG. 1) which may include fastening bolts and mounting sleeves. The shaft of the capstan 42 is therefore supported at positions adjacent its opposite ends by the bushings 98 and 102. The axially spaced bearing supports at bushings 98 and 102 prevent the shaft of the capstan 42 from wobbling and prevent excessive wear on any one of the bushings 98 or 102 since a pair of the bushings are available to withstand the bearing load.

The rotor 90 is fixed to the shaft of the capstan 42 intermediate the ends of the capstan shaft and between the bushings 98 and 102. The rotor 90 rotates with the capstan shaft. The rotor comprises a center disc 108 which is connected to the capstan shaft and which extends radially outward to a cylindrical ring 110. One edge 112 of the cylindrical ring 110 extends from the center disc 108 toward the knurled end 100 of the capstan shaft. The other opposite edge 114 of the ring 110 extends from the center disc 108 toward the opposite end of the capstan shaft. The inner radial surface of the edge 112 is cylindrical, and a plurality of axially-extending grooves 115 are formed into the edge 112. The edge 114 is formed in a stepped tooth-like configuration. A plurality of equal circumferential width projections 116 extend from the edge and are separated by substantially equal width recesses 118. The rotor 90 is preferably constructed of plastic material.

In order to measure the rotational condition of the captstan 42, a transducer 120 is attached to the intermediate plate 104 at a position radially adjacent the stepped or tooth-like rotor edge 114 to sense the movement of projections 116 and recesses 118 during rotor rotation. The transducer 120 preferably includes a source of projected light which is intersected by the projections 116 as the capstan 42 rotates. When a projection 116 intersects the projected optical beam, light is reflected. When a recess 118 intersects the projected optical beam, very little or no light is reflected. The transducer 120 detects the altered light beam, preferably by sensing the light reflected by the projections 116, and a digital signal is derived. One digital signal is derived from the movement of each projection 116 past the transducer. The projections 116 and recesses 118 therefore define a code which is sensed by the transducer 120. Accordingly, with a plurality of projections 116 present on the circumference of the rotor ring 110, i.e. a high resolution code, a highly accurate measurement of each individual revolution of the tape drive capstan 42 and each fractional revolution of the tape drive capstan is obtainable. The digital signal supplied by the transducer 120 can be counted in order to determine the linear position of the tape from an initial starting point, or the rate at which the signals are supplied can be sensed in order to control the speed of one or both of the motors 16 and 22.

The flywheel 92 can rotate relative to the shaft of the capstan 42 and the rotor 90 as a result of its free rotational mounting and support on the capstan shaft. The flywheel 92 includes a center hub 122 within which a bushing 124 is positioned, a radially outward extending disc portion 126, and a rim portion 128 within which a groove 130 is formed. The rim portion 128 is of considerable mass for achieving good flywheel effects. The rim portion 128 extends radially outward from the rotor, and the edge 112 of the rotor is inwardly radially adjacent a portion of the rim portion 128. A groove 130 extends into the rim portion 128 from the outer circumferential surface of the flywheel.

Rotational movement is imparted to the flywheel by the belt 97 driven by the play motor 16. The belt 97 is received in the groove 130. A pulley 132 attached to the output shaft 133 of the play motor 16 also contacts and moves the belt 97. The pulley 132 is considerably smaller in circumference than the groove 130. The difference in circumferences accomplishes a speed reduction and the rotational rate of the flywheel 92 is less than the rotational rate of the output shaft 133 of the play motor. The relatively large mass of the flywheel and the speed reduction tend to smooth any minor speed fluctuations that may occur in the play motor. As shown in FIG. 1, the play motor is secured to the rear wall 58 of the tape transport by the plate 104 and fastening means 106. Preferably, the flywheel 92 is constructed of relatively high density, heavy material such as brass, in order to achieve the best flywheel effects. However, other types of materials may also be satisfactorily employed.

In order to couple rotational movement of the flywheel 92 to the rotor 90, there is provided clutch means of a ratchet-like and centrifugal force-operative nature. As shown in FIGS. 3, 4A, 5, 6 and 7, the clutch means comprises a clutch disc 138 operatively retained to the flywheel 92 and a pair of diametrically oppositely positioned detent cams 140 and 142 pivotally connected to the clutch disc 138. A center opening 144 is formed through the clutch disc 138 and receives the center hub 122 of the flywheel 92 therein in a frictionally engaging manner to rigidly attach the clutch disc to the flywheel. The detent cams 140 and 142 are located within slots 146 and 148 which are formed in a thicker center portion 150 of the clutch disc 138. Center posts 152 and 154 extend out of the slots 146 and 148 and pivotally retain the cams 140 and 142 for pivotable movement within the slots. Washers 156 are fitted over the center posts 152 and 154 after the detent cams have been placed thereover, and the outer ends of the center posts are distorted outwardly over the washers 156 to hold them and the detent cams securely to the clutch disc 138. A semicircular spring 157 extends between the detent cams 140 and 142 and biases them radially inward.

The U-shaped slots 146 and 148 are of sufficient width to allow the detent cams 140 and 142 to pivot freely about the center posts 152 and 154. Each U-shaped slot 146 and 148 opens radially outward and forward in the direction of normal flywheel rotational movement. When the detent cams are biased to a radial inward position, as shown in FIG. 5, the cams 140 and 142 are generally aligned with the orientation of the U-shaped slots. However, once flywheel rotation commences at a rate less than the playing rate, centrifugal force pivots the detent cams to a radial outward position by overcoming the bias force from spring 157, as shown in FIG. 7, and an outer pointed end 158 on each detent cam engages a groove 115 in the inner surface of the rotor edge 112. Once the pointed ends 158 engage the grooves 115, motion from the flywheel 92 is imparted to the rotor 90. The detent cams pivot outward to a position extending more radially outward and with a reduced component of orientation in the direction of flywheel rotational movement, as compared to the non-extended position. A component of force is transferred to the rotor 90 in the direction of flywheel rotation to positively rotate the rotor with the flywheel 92. The centrifugal engaging force of the ends 158 in the grooves 115 increases with increasing flywheel rotational rates. The positive engagement of the detent cam ends 158 in the grooves 115 results in full power transmission between the flywheel and the rotor. No power loss occurs, as does with drive systems in which a resilient drive wheel member frictionally contacts and rotates a driven shaft.

Should the rotor be rotated at a greater rotational speed than the flywheel 92, the engagement of the pointed ends 158 with the grooves 115 is quickly released because the radial outward and forward orientation of the detent cams 140 and 142 allows the detent cam points 158 to quickly pivot slightly inward and release contact with the rotor grooves when the rotor speed increases. Releasing the engagement of the detent cam points with the rotor grooves, in this manner, allows the rotor and capstan to rotate at greater speeds than the flywheel. A resulting ratchet-like clutching arrangement is achieved. Isolation between the flywheel and the rotor exists when the rotor is moved at a speed greater than the speed of the flywheel.

In order to rotate the rotor 90 and tape drive capstan 42 at a rotational rate greater than the normal playing rate, and thereby rapidly advance the tape at high speed from one location to another, rotational movement from the high speed motor 22 is operatively coupled from the high speed driver 94 to the drive wheel 96. As shown in FIGS. 2, 3 and 4A, the high speed motor 22 is attached to an outer mounting plate 160. The plate 160 is fixed by fastening means 106 to the intermediate plate 104 and to the rear wall 58 of the transport frame 56. The plate 160 and the fastening means 106 position the high speed motor 22 with its output shaft 162 coaxially aligned with the rotational shaft of the capstan 42. Since the high speed driver 94 is fixed to the motor shaft 162 and the driver wheel 96 is fixed to the capstan shaft, it is apparent that the motor shaft 162, the high speed driver 94 and the drive wheel 96 rotate about the common rotational axis of the capstan 42, the rotor 90 and the flywheel 92.

The drive wheel 96 is shown in FIGS. 3 and 4A and comprises a center hub 164 preferably formed of plastic material which is press fitted onto the end of the capstan shaft opposite the knurled end 100. A tire-like ring 166 of resilient material such as rubber fits on the outer circumference of the hub 164.

The high speed driver 94 is shown in FIGS. 3, 4B, 8 and 9 and comprises a high speed drive disc 168, a pair of high speed cams 170 and 172 pivotally mounted on the high speed drive disc 168, and a biasing spring 174 operatively connected between the cams 170 and 172. The drive disc 168 is formed preferably of plastic material with a center opening 176 which is press fitted onto the output shaft 162 of the high speed motor 22. A pair of radially disposed mounting posts 178 extend from the disc 168 at positions near its outer circumference. Each of the cams 170 and 172 is preferably formed of heavy material such as brass, and each has a center hole 180 adapted to receive one mounting post 178 therein. The size of the opening 180 is slightly larger than the diameter of the post 178, thereby allowing the cams 170 and 172 to freely pivot about the posts 178 when retained thereon. To hold the cams 170 and 172 to the mounting posts, the material of the posts 178 is distorted outward over washers 182 which are placed over the posts 178 and on top of the cams.

Each cam 170 and 172 is formed with a flat inner surface 184 extending at an acute angle to the longitudinal dimension of each cam. A hole 186 is formed in each cam 170 and 172 at a position between the center opening 180 and an end 188 opposite the end at the angular surface 184. Each cam 170 and 172 contains a greater amount of material between the opening 180 and the end 188 than between the center opening 180 and the end angular surface 184. The spring 174 extends in a generally semicircular or curved relation between the holes 186 in the cams 170 and 172. The purpose of the spring 174 is to normally bias the ends 188 of the cams 170 and 172 to a radially inward position as shown in FIG. 8, wherein the cam ends contact stop posts 189 extending upward from the disc 168. The spring 174 is initially formed with a semicircular diameter less than the distance between the holes 186 in cams 170 and 172. The spring 174 is expanded slightly when retained in the holes and its bias force normally holds the cams 170 and 172 with their ends radially inward against the stop posts 189 and with their longitudinal dimension extending approximately tangent to the rotational path as shown in FIG. 8.

In order to rapidly advance the tape by rotating the capstan 42 at a substantially higher rate than the normal playing rate, the high speed motor 22 is energized to rotate the high speed driver 94 at a high rate. Centrifugal force acts on the larger ends 188 of the cams 170 and 172 and forces the ends 188 radially outward away from the stop posts 189 as shown in FIG. 9. The cam ends at the inner angular surfaces 184 are pivoted radially inward until the radial inner corner point made by each angular surface 184 contacts and engages the tire-like ring 166 of the drive wheel 96, as shown in FIG. 9. The centrifugal force acting on the cams 170 and 172 is of sufficient magnitude to overcome the bias force from the spring 174. The driver wheel 96 rotates at the same high rate of speed as the driver 94 because the corner points made by the cam surfaces 184 firmly engage or grip the tire-like sleeve 186. The high rate of rotary motion from the high speed motor 22 is thereby coupled through the clutching means defined by the centrifugal force-activated speed driver 94 and the drive wheel 96. When sufficient high speed advancement has occurred, the high speed motor 22 is de-energized. As the high speed driver 94 slows and eventually stops, the bias force from spring 174 predominates over the centrifugal force acting on the ends 188 of the cams 170 and 172. The spring 174 returns the cams to their normal position oriented approximately tangent to the direction of rotation of the high speed driver 94. Once the cams 170 and 172 have released the engagement with the the tape capstan 42 remains available to be rotated by the flywheel 92 in the manner previously described.

When the high speed motor 22 rotates the capstan 42, the ratchet-like clutch mechanism defined by the detent cams 140 and 142 carried by the clutch disc 138 release any operative engagement with the rotor 90. Accordingly, the play motor 16 and flywheel 92 can continue rotating during high speed advancement of the tape. Once the rotational rate of the capstan 42 returns to approximately the normal playing speed, the detent cams 140 and 142 associated with the flywheel 92 again become operative to rotate the rotor and its attached tape drive capstan 42 at the normal playing rate. Of course, the play motor 16 can be de-energized during high speed advancement if desired. The amount of bias force available from spring 174 is predetermined to maintain the cam ends 184 out of contact with the sleeve 166 until the high speed driver 92 rotates at rates greater than the normal playing rate established by the flywheel rotational rate. Similarly, the cams 170 and 172 pivot inward to release engagement with the driver wheel 96 at rotational rates equal to and less than the normal playing rate.

The clutching means operative between the high speed motor and the tape drive capstan and between the flywheel and tape drive capstan effectively connect only one of the drive sources, the high speed motor 22 or the play motor 16- flywheel 92 combination, to the tape drive capstan at a time. The other nonconnected drive source is effectively isolated from operative engagement with the capstan. When neither drive source is operative, the capstan is free to rotate slightly if acted on by inertia of rotor 19, thereby allowing certain movement flexibility rather than introducing detrimental forces on the tape.

TAPE POSITION MEASURER AND INDICATOR

During both high speed tape advancement and normal tape playing rates, the position of the tape 18 with respect to the transducer head 22 is measured and indicated by use of the counter and indicating means shown in FIG. 10. The transducer 120 operates in association with the stepped or tooth-like edge code structure 112 of the rotor 90. Signals are delivered from the transducer 120 because of the passage of the code defined by the edge projections 116 and edge recesses 118 relative to the transducer 120, as has been described. With each revolution of the rotor, therefore, there are a plurality of digital measurement signals supplied by the transducer 120. Each rotation of the rotor results in a rotation of the tape drive capstan and a corresponding amount of linear advancement of the tape 18. The amount of linear tape advancement is determined by counting the signals delivered by the transducer 120, and a counter 190 accomplishes that function.

In order to determine the extent of linear advancement of the tape, a beginning or initial sensing point must be determined, because the tape 18 is a continuous endless loop. As shown in FIG. 1, a strip 192 of metallic foil extends transversely completely across the width of the tape at a single starting or reference position. A tape start point detector or transducer 194 (FIGS. 1 and 2) delivers a unique signal when it senses the passage of the foil 192. A start point detector 194 includes electrical elements which preferably contact the foil 192 and supply a signal indicating the passage of the foil 192. The start point detector 194 supplies an enable signal to the counter 190 and the counter 190 begins counting pulses from the transducer 120 after receiving the enable signal. The normal information recorded on the various recording tracks of the tape 18 does not create the unique signal created by the foil 192. Of course, the tape 18 could also be recorded to supply a unique signal to the information transducer 20 at a certain initial sensing point, thereby achieving the same function as the foil 192 and detector 194.

Once the counter 190 os enabled, it counts the measurement pulse signals from the transducer 120 and supplies a signal to a tape position indicator or display 196. The signal supplied by the counter 190 to the position display 196 is directly related to the number of digital pulse signals supplied by the transducer 120. It is appreciated that the counter 190 may include various proportionalizing elements which convert the actual number of pulses received from the transducer 120 into signals proportional to the extent of linear advancement of the tape in units such as feet or meters or time referenced to the normal playing speed. The position display 196 indicates the extent of linear advancement of the tape from the initial reference point at the foil 192. The position display 196 is also reset each time the foil 192 passes the detector 194, because the starting point of the continuous endless tape is also its ending point. The signal supplied by the start point detector 194 also is supplied to the display 196 to reset it. The indication from the display 196 is always measured with respect to the reference or start point on the tape.

The degree of accuracy available from the tape position measuring and indicating means is substantial. The measurement signals supplied by the transducer 120 are directly related to the linear advancement and position of the tape. Each whole and fractional revolution of the capstan directly corresponds with a predetermined amount of linear advancement of the tape. Measurements are not dependent on revolutions of spools wherein the tape is coiled thereon or uncoiled therefrom in a nonlinear relationship with each revolution. Each digital measurement signal derived by the reflective transducer corresponds to a fraction of a revolution of the capstan and to very small increments of linear advancement of the tape due to the substantial difference in circumferences of the capstan and the rotor. The tape can be located and positioned with a degree of accuracy not achieved by prior art revolution counters, mechanical indexing devices and the like.

It is apparent that the present invention provides a high speed advancement capability for tape transport apparatus of the type wherein the capstan is also the driving element for advancing the tape. Of course, the present invention is advantageously used in conjunction with transport apparatus for continuous endless-loop tapes contained in cartridges. The improvements from the present invention in the field of measuring and indicating the position and extent of advancement of tape in a tape transport apparatus are also substantial because the arrangement provides a greater degree of accuracy than most prior art devices intended to accomplish a similar function.

The preferred embodiment has been described with a degree of particularity. It should be undersood, however, that the present disclosure has been made by way of example and that changes in details may be made without departing from the scope of the invention defined by the appended claims.

What is claimed is:

1. In a transport apparatus for recording tape having a driven rotationally mounted tape drive capstan for advancing the tape and a pinch roller for firmly engaging the tape between the tape drive capstan and the pinch roller and motor means for rotating the tape drive capstan, an improvement comprising, in combination:

rotor means operatively connected to rotate with said tape drive capstan and to rotate said tape drive capstan;

flywheel means rotationally positioned coaxially with said rotor means and operatively connected with said motor means to be rotated at a first predetermined rotational rate;

at least one detent cam operatively pivotably connected to said flywheel means and operative from centrifugal force at the first predetermined rotational rate of said flywheel means to engage said rotor means and rotate said rotor means in conjunction with said flywheel means upon the rotational axis of the tape drive capstan being no greater than the first predetermined rotational rate;

a drive element operatively connected to rotate said tape drive capstan;

a high speed driver element rotationally positioned on said transport apparatus and operatively connected with said motor means to be rotated at a second predetermined rotational rate, the second predetermined rotational rate being substantially greater than the first predetermined rotational rate; and at least one cam element pivotably connected to the high speed driver element and operative from centrifugal force at rotational rates of the high speed driver element greater than the first predetermined rotational rate and at least equal to the second predetermined rotational rate to engage said drive element and rotate said drive element in conjunction with said high speed driver element.

2. An invention as defined in claim 1 wherein said tape transport apparatus is of the type for use in conjunction with cartridges in which the tape is contained within a housing and in which the tape is presented in an aperture of the housing in a plane generally parallel to a major cover of the housing.

3. An invention as defined in claim 1 wherein:

said rotor means comprises a disc operatively connected to the tape drive capstan and a cylindrical edge attached to the disc; and each detent cam carried by said flywheel means contacts the cylindrical edge when the flywheel means is rotated at the first predetermined rate.

4. An invention as defined in claim 3 wherein:

said drive element comprises a drive wheel; and each cam carried by the high speed driver element contacts and engages the drive wheel when the high speed drive element is rotated at the second predetermined rate.

5. An invention as defined in claim 4 wherein said drive wheel includes a resilient outer circumference.

6. An invention as defined in claims 1, 3 or 4 wherein said improvement further comprises:

code means operatively associated with said rotor means for designating at least a part of each revolution of said rotor means; and sensor means for sensing said code means and supplying signals indicative of rotational movement of said tape drive capstan.

7. An invention as defined in claim 6 further comprising:

counter means receptive of each signal from said sensor means and operative to supply a count signal related to the signals supplied by said sensor means; and means receptive of the count signal from said counter means and operative to correlate signals from said sensor means to revolutions of the tape drive capstan, and to correlate revolutions of the tape drive capstan to linear movement of the tape, and to supply a position signal indicative of the extent of linear tape advancement.

8. An invention as defined in claim 7 further comprising display means receptive of the position signal for displaying an indication of tape advancement.

9. An invention as defined in claim 7 wherein:

said code means optically designates a plurality of partial intervals of each complete revolution of said rotor means; and said sensor means is optically responsive.

10. An invention as defined in claim 9 wherein said tape transport apparatus is of the type for use in conjunction with cartridges in which the tape is contained within a housing and in which the tape is presented in an aperture of the housing in a plane generally parallel to a major cover of the housing.

11. A tape transport apparatus for advancing recording tape comprising:

a rotationally mounted tape drive capstan;

a pinch roller for firmly engaging the recording tape between the tape drive capstan and the pinch roller;

motor means adapted for rotating said tape drive capstan;

rotor means operatively connected to rotate with said tape drive capstan;

flywheel means rotationally positioned coaxially with said rotor means;

means operatively connecting said flywheel means and said motor means for operatively rotating said flywheel means at a first predetermined rotational rate;

first clutch means operative between said flywheel means and said rotor means and operative from centrifugal force at the first predetermined rate for rotating said rotor means in conjunction with the flywheel means upon the rotational rate of the tape drive capstan being no greater than the first predetermined rotational rate;

a drive element connected for rotating said tape drive capstan;

a high speed driver element rotationally positioned coaxially with said drive element;

means operatively connecting said high speed driver element and said motor means for operatively rotating said high speed driver element at a second predetermined rotational rate, the second predetermined rate being substantially greater than the first predetermined rate;

second clutch means operative between said high speed driver element and said drive element and operative from centrifugal force at rotational rates greater than the first predetermined rotational rate and less than the second predetermined rotational rate for rotating said drive means in conjunction with said high speed driver element;

code means operatively associated with said rotor means for designating a part of each revolution of said tape drive capstan; and sensor means for sensing said code means and supplying a signal indicative of rotational movement of said tape drive capstan.

12. An invention as defined in claim 11 wherein said tape transport apparatus is of the type for use in conjunction with cartridges containing a continuous endless loop of recording tape contained in a housing and wherein the tape is presented in an aperture of the housing in a plane generally parallel to a major cover of the cartridge housing.

13. An invention as defined in claims 11 or 12 wherein said rotor means, said flywheel means, said drive element and said high speed driver element are retained for rotation coaxially with respect to one another.

14. An invention as defined in claim 11 wherein said code means is optical and said sensor means is optically responsive.

* * * * *